United States Patent
Shibata et al.

(10) Patent No.: US 7,091,143 B2
(45) Date of Patent: Aug. 15, 2006

(54) GLASS FUNNEL FOR CATHODE RAY TUBE, AND CATHODE RAY TUBE

(75) Inventors: Shuichi Shibata, Ibaraki (JP); Tetsuji Yano, Kanagawa (JP); Jaeho Lee, Asan (KR); Yuichi Kuroki, Kanagawa (JP); Mikio Ueki, Hyogo (JP)

(73) Assignees: The Circle for the Promotion of Science and Engineering, Tokyo (JP); Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/934,452

(22) Filed: Sep. 7, 2004

(65) Prior Publication Data

US 2005/0052135 A1    Mar. 10, 2005

Related U.S. Application Data

(63) Continuation of application No. PCT/JP03/02593, filed on Mar. 5, 2003.

(30) Foreign Application Priority Data

Mar. 5, 2002    (JP)    .............................. 2002-058740

(51) Int. Cl.
   *C03C 3/105*    (2006.01)
   *C03C 3/102*    (2006.01)
(52) U.S. Cl. .......................................... 501/60; 501/62
(58) Field of Classification Search ............ 501/60–62
   See application file for complete search history.

(56) References Cited

U.S. PATENT DOCUMENTS

| 5,192,718 | A | * | 3/1993 | Danielson | .................... 501/60 |
|---|---|---|---|---|---|
| 5,599,752 | A | * | 2/1997 | Piers et al. | .................... 501/62 |
| 5,725,627 | A | * | 3/1998 | Piers et al. | .................... 65/72 |
| RE36,838 | E | * | 8/2000 | Sugawara et al. | ...... 313/477 R |
| 6,218,775 | B1 | * | 4/2001 | Tammaro | .................... 313/480 |
| 6,251,811 | B1 | * | 6/2001 | Yanagisawa et al. | ......... 501/60 |
| 6,437,501 | B1 | * | 8/2002 | Komori | .................... 313/480 |
| 6,597,102 | B1 | * | 7/2003 | Sugawara et al. | ...... 313/477 R |
| 6,607,999 | B1 | * | 8/2003 | Hachitani | .................... 501/69 |
| 6,642,163 | B1 | * | 11/2003 | Komori et al. | ............... 501/60 |
| 6,844,669 | B1 | * | 1/2005 | Sugawara et al. | ......... 313/480 |
| 6,865,909 | B1 | * | 3/2005 | Komori et al. | ................. 65/23 |
| 2004/0038798 | A1 | * | 2/2004 | Komori et al. | ............... 501/60 |

FOREIGN PATENT DOCUMENTS

| EP | 1125900 A1 | 8/2001 |
|---|---|---|
| EP | 1142840 A2 | 10/2001 |
| GB | 2376463 A | 12/2002 |
| JP | 2002-60242 A | 2/2002 |

* cited by examiner

*Primary Examiner*—J. A. Lorengo
*Assistant Examiner*—Elizabeth A. Bolden
(74) *Attorney, Agent, or Firm*—Oblon, Spivak, McClelland, Maier & Neustadt, P.C.

(57) ABSTRACT

A glass funnel suitable for a chemical strengthening method of an electric field application type without impairing the safety of a cathode ray tube. A glass funnel for a cathode ray tube, characterized in that glass at a body portion 3 contains at least $Na_2O$ and $K_2O$, the conductivity of said glass at the strain point is at least $4\times10^{-6}$ S/cm, the conductivity at 150° C. is at most $5\times10^{-12}$ S/cm, and a compressive stress layer is formed by a chemical strengthening method on at least part of the outer surface of the body portion 3.

11 Claims, 1 Drawing Sheet

GLASS FUNNEL FOR CATHODE RAY TUBE, AND CATHODE RAY TUBE

TECHNICAL FIELD

The present invention relates to a cathode ray tube to be used for e.g. a display for a television broadcast receiver (hereinafter referred to as a television) or a computer, and a glass funnel to be used for such a cathode ray tube.

BACKGROUND ART

The envelope of a cathode ray tube is constituted by a glass bulb 5 which comprises a glass panel 1 (hereinafter sometimes referred to simply as a panel) for displaying picture images ad a glass funnel 2 (hereinafter sometimes referred to simply as a funnel) sealingly bonded to the panel 1, as shown in FIG. 1. The funnel 2 has a neck 4 accommodating an electron gun welded to a funnel-shaped body portion 3 having an approximately rectangular sealing portion.

The body portion 3 of the glass funnel 2 is formed by an aluminosilicate glass ($SiO_2$—$Al_2O_3$—$R_2O$—R'O) containing a large amount of lead for shielding from X-rays. Further, the body portion 3 is a member for a cathode ray tube and thus it is required to have high insulating properties, and the contents of $Na_2O$ and $K_2O$ are usually adjusted to be substantially the same, so as to achieve high resistance by a mixed alkali effect. The glass bulb is used as a vacuum vessel, whereby atmospheric pressure is exerted to the outer surface, and consequently, a tensile stress attributable to an asymmetrical shape as is different from a spherical shell, is exerted over a relatively wide range. Hereinafter, a stress formed by a difference between the inner and outer pressures when the glass bulb is evacuated, will be referred to as a vacuum stress.

Further, in the process for producing a cathode ray tube, the glass bulb is heated to a considerably high temperature. Especially when evacuation is carried out while maintaining the bulb at a high temperature of about 350° C., a stress by the temperature difference resulting in such a step i.e. a thermal stress will be formed on the glass bulb, and the thermal stress will add to the vacuum stress, whereby in an extreme case, vigorous implosion may occur by instantaneous inflow of air and its counteraction, and thus damages may extend to the surrounding.

To guarantee prevention of such problems, an external pressure loading test is carried out by pressurizing a glass bulb uniformly scratched by #150 emery paper, by air pressure or hydraulic pressure, taking into consideration the practical useful life of the cathode ray tube and the intensity of scratching on the glass surface which takes place in the step of assembling the glass bulb and the cathode ray tube, whereby the difference between the inner and outer pressures upon breakage, is determined, and the glass bulb is made to be durable against at least 0.25 MPa of such a pressure difference.

Further, in recent years, cathode ray tubes for televisions are desired to have a large screen and a flat face portion and to have the depth decreased and the weight reduced. With respect to the decrease in the depth, the design is possible by increasing the glass thickness to suppress the vacuum stress, however, the mass is remarkably increased, such being impractical.

Accordingly, in order that the glass has an adequate strength without increasing the glass thickness, it is required to improve the strength of the glass, and as the method, it has been practically proposed to form a compressing stress layer on the surface of a panel in a thickness of ⅙ of the thickness of the glass by means of e.g. a physical strengthening method, as disclosed in Japanese Patent No. 2,904,067. However, in order to achieve the decrease in the depth and the reduction in the weight of the glass bulb at the same time, it is required to strengthen the funnel, and in such a case, the funnel having a three dimensional structure and a non-uniform wall thickness distribution as compared with the panel has to be uniformly quenched.

However, it is very difficult to uniformly cool such a funnel, and it has been impossible to impart a large compressive stress to the funnel by a physical strengthening method. Accordingly, in a case where the physical strengthening method is employed, the decrease in the depth of the glass bulb i.e. the degree of flatness is limited since the imparted compressive stress is relatively small.

On the other hand, it is known to reduce the weight by strengthening the surface of a glass bulb by a chemical strengthening method. This method is a method wherein certain alkali ions in the glass surface layer are substituted by ions larger than the alkali ions at a temperature of not higher than the strain point of the glass, and a compressive stress layer is formed on the surface by the volume increase. For example, it is a method wherein glass is immersed in molten potassium salt at a temperature of not higher than the strain point of the glass (for example 460° C.), and Na ions in a glass surface layer are substituted by K ions in the molten potassium salt to introduce K ions in the glass surface layer. In the case of such a chemical strengthening method, a large compressive stress up to the maximum of about 500 MPa can be obtained, and it is advantageous to achieve flatness over the physical strengthening in that no unnecessary remaining tensile stress will be formed by a heat treatment. However, even if the chemical strengthening is applied to the funnel by a conventional immersion method in which the thermal diffusion is applied, a strengthened layer (compressive stress layer) of only about 30 µm can be formed. Further, since the ion exchange rate is controlled by the thermal diffusion, it takes from over ten days to several days to obtain a strengthened layer of about 30 µm, such being problematic.

On the other hand, in addition to the chemical strengthening by the thermal diffusion, a chemical strengthening method of an electric field application type has been known. This method is a method wherein an electric field is applied other than the heat so that large alkali ions having a small mobility are injected at the glass surface layer on the anode side in a short period of time, and that relatively small alkali ions having a high mobility are leaked from the glass surface layer at the cathode side, whereby a compressive stress layer is formed at the anode side. However, even if the chemical strengthening is attempted on a conventional funnel by such a method, it was impossible to carry out the chemical strengthening in an adequately short period of time.

DISCLOSURE OF THE INVENTION

A conventional glass composition for funnel is not suitable for the chemical strengthening method of an electric field application type, and even if alkali ion exchange was carried out, it was not possible to form a compressive stress layer having an adequate thickness required against the above-described scratching by #150 emery paper. In the chemical strengthening of an electric field application type, the exchange amount of alkali elements is determined depending upon the amount of electricity flow, and it is possible to form a strengthened layer in a shorter period of time when the conductivity is higher and the applied voltage is higher.

However, the above glass composition may undergo dielectric breakdown if the applied voltage is increased too much, and it was difficult to achieve the treatment in a short period of time by the applied voltage.

Further, glass has such properties that the higher the temperature, the higher the conductivity in general, and thus it is considered to increase the treatment temperature as a method to increase the conductivity. However, in the case of a conventional glass composition for funnel, in order to increase the conductivity to carry out a treatment in a short period of time, the treatment has to be carried out at a temperature higher than the strain point. In this case, by means of the stress relaxation due to this high temperature, no adequate compressive stress value for a flat funnel may be obtained, such being problematic.

Further, it is considered to change the glass composition, for example, to employ Na alone as the alkali element, so as to increase the conductivity. However, in such a case, electricity is likely to flow even at room temperature, and thus dielectric breakdown is likely to occur in operation of the cathode ray tube, such being problematic.

The present invention has been made in view of the above problems, and it is an object of the present invention to form a compressive stress layer having desired thickness and compressive stress value by the above chemical strengthening in a short period of time by means of a funnel glass optimum for the chemical strengthening of an electric field application type and to solve the problem of an excessive load of the vacuum stress of the glass bulb when the glass funnel is made flat and thin, to solve a problem of the thermal stress or the damage during the production of a cathode ray tube, such as in a step of evacuation, and to provide a glass funnel for a cathode ray tube having an adequate X-ray shielding ability, and a cathode ray tube employing such a glass funnel.

The present invention has been made to accomplish the above object, and provides a glass funnel for a cathode ray tube, characterized in that glass at a body portion of the glass funnel contains at least $Na_2O$ and $K_2O$, the conductivity of said glass at the strain point is at least $4\times10^{-6}$ S/cm, the conductivity at 150° C. is at most $5\times10^{-12}$ S/cm, and a compressive stress layer is formed by a chemical strengthening method on at least part of the surface of the body portion.

Further, the present invention is characterized in that the glass funnel has at least one of the following essentialities.

1) The above strain point is at least 455° C.
2) The thickness of at least part of the above compressive stress layer is at least 60 μm.
3) The stress value $\sigma_c$ of at least part of the above compressive stress layer is $|\sigma_c| \geq 80$ MPa.
4) The glass at the above body portion consists essentially of, as represented by mass percentage of oxides based on the total mass:

| | |
|---|---|
| $SiO_2$ | 40.0 to 55.0% |
| $Al_2O_3$ | 0.5 to 8.0% |
| $Na_2O$ | 4.0 to 10.0% |
| $K_2O$ | 5.0 to 10.0% |
| PbO | 15.0 to 22.0% |
| SrO | 1.0 to 11.0% |
| BaO | 0.0 to 6.0% |

-continued

| | |
|---|---|
| ZnO | 0.0 to 8.0% |
| $ZrO_2$ | 0.0 to 3.0% |
| $Li_2O$ | 0.0 to 2.0% |
| CaO | 0.0 to 5.0% |
| MgO | 0.0 to 1.0% | and $1.6\times PbO+SrO+ZrO_2+0.5\times BaO+0.5\times ZnO \geq 37.0\%$, and $SrO+ZnO+CaO \geq 6.0\%$.

5) The mass content ratio of $Na_2O$ and $K_2O:K_2O/(Na_2O+K_2O)$ is from 0.43 to 0.65.
6) The X-ray absorption coefficient is at least 60 $cm^{-1}$ at a wavelength of 0.06 nm.

Further, the present invention provides a cathode ray tube employing the above glass funnel for a cathode ray tube.

In the present invention, the contents and the mass content ratio of the glass composition are values of the glass funnel before the chemical strengthening is applied, and in the case of a glass funnel, at least part of which is subjected to the chemical strengthening, they are contents and a mass content ratio of the glass at the non-strengthened region.

EXPLANATION OF NUMERICAL REFERENCES

Figure 1:
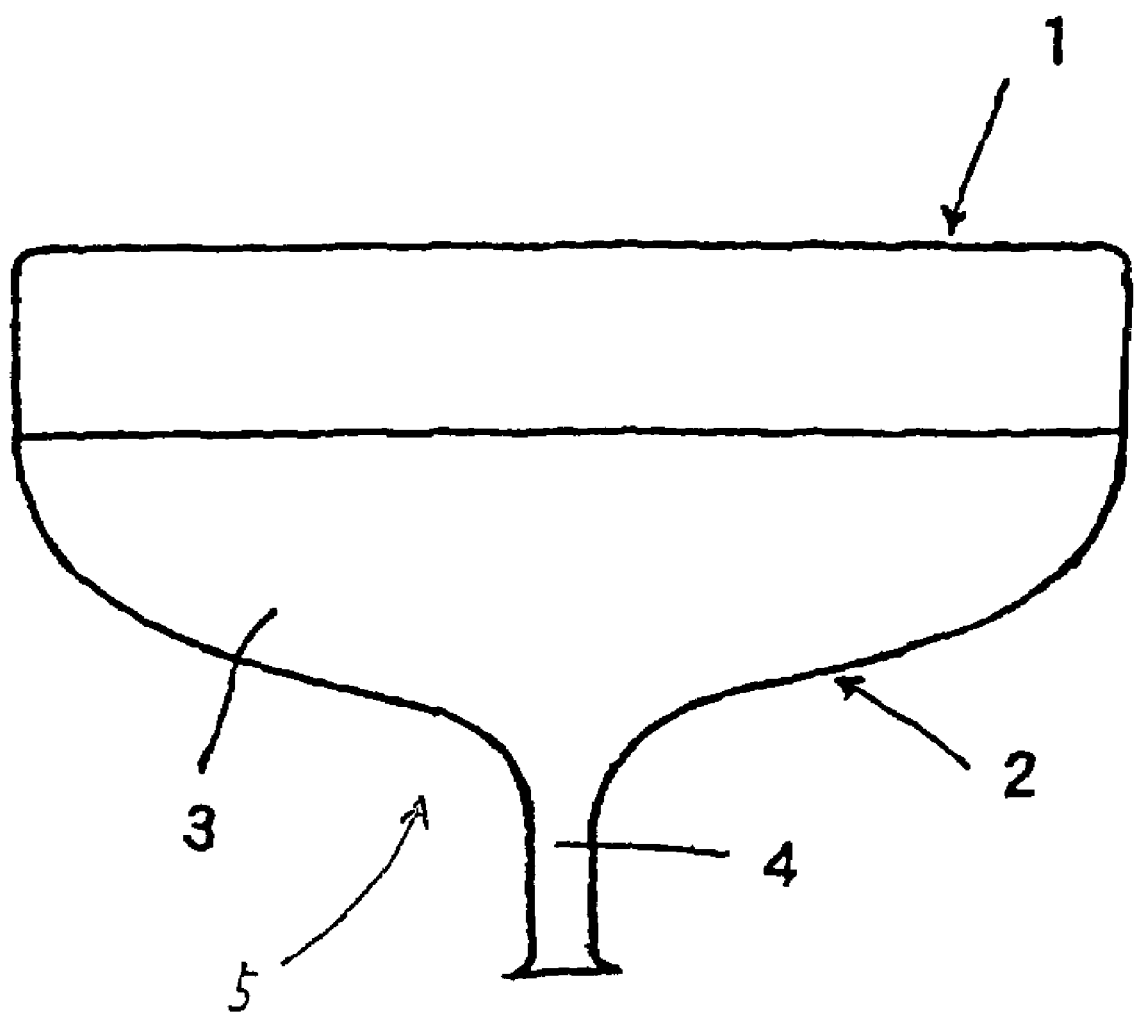
FIG. 1: A plan view illustrating a glass bulb for a cathode ray tube.

1: Glass panel
2: Glass funnel
3: Body portion
4: Neck
5: Glass bulb

BEST MODE FOR CARRYING OUT THE INVENTION

Now, the present invention will be explained in detail.

The chemical strengthening method of the glass is a method wherein alkali ions in the glass surface layer are substituted by monovalent cations having larger ion radii in an external medium to form a compressive stress, as mentioned above.

In silicate glass, alkali and alkaline earth elements are irregularly contained as network modifiers in the network structure constituted by Si—O bonds, but the alkali ions in the glass surface layer can be substituted by monovalent cations having larger ion radii in an external medium, by utilizing a characteristic such that among network modifiers, monovalent cations can be moved in the interior of glass relatively freely. As a result, large ions will get into the positions from which alkali ions detached to cause a volume increase, whereby a compressive stress is formed. In the chemical strengthening method of an electric field application type, electrodes are provided on both sides of the glass and an electric field is applied, whereby large alkali ions in an external medium get into the glass at the glass surface on the anode side, and small alkali ions leak at the glass surface on the cathode side.

Specifically, it is a method wherein glass containing $Na^+$ is immersed in a $KNO_3$ molten salt bath maintained to a temperature slightly lower than the strain point of the glass, an anode is disposed on one side of the glass, a cathode is disposed on the other side of the glass, and an electric field is applied to between the anode and the cathode, so that $K^+$ is made to get into the glass surface layer. Otherwise, it is a method wherein a paste containing a $KNO_3$ molten salt is coated on both sides of glass containing $Na^+$, an anode is disposed on one paste-coated side of the glass in contact with each other, a cathode is disposed on the other paste-coated side of the glass in contact with each other, the glass is heated to a temperature slightly lower than its strain point, and an electric field is applied to between the anode and the cathode so that $K^+$ is made to get into the glass surface layer on the anode side. By such a chemical strengthening method of an electric field application type, a compressive stress layer can be formed in a short period of time as compared with a common chemical strengthening method of a thermal diffusion type, and of course a high compressive stress value can be imparted as compared with a physical strengthening method, and thus it is suitable to make the funnel flat and thin. As the molten salt, various ones which have been conventionally known in the chemical strengthening method may optionally be used, and the method is not limited to the above chemical strengthening method employing a $KNO_3$ molten salt.

If the conductivity at the temperature of the strain point of the glass of the glass funnel is lower than $4 \times 10^{-6}$ S/cm, $K^+$ ions cannot adequately be moved in a short period of time even if an electric field is applied, and no adequate thickness of the strengthened layer can be obtained. Further, if the conductivity at 150° C. is higher than $5 \times 10^{-12}$ S/cm, dielectric breakdown is likely to occur in operation of a cathode ray tube (CRT).

Further, if the strain point of the glass of the funnel is lower than 455° C., it tends to be difficult to raise the temperature at the time of electric field application, and as a result, physical strengthening in a short period of time cannot be carried out. Thus, the strain point of the glass of the funnel is preferably at least 455° C. Preferably, the strain point of the glass of the funnel is at most 530° C.

By the above chemical strengthening method, it is possible to form a compressive stress layer of at least 80 MPa on the outer surface layer, or on the outer surface layer and the inner surface layer, of the funnel, more exactly, at least its body portion, whereby the bending strength can be improved from about 4 to about 6 times (220 to 330 MPa) as compared with non-strengthened state (from 50 to 65 MPa). Particularly when the glass funnel is formed into a glass bulb, it is preferred to form at least the above-mentioned compressive stress layer on the outer surface or on the outer surface layer and the inner surface layer of the body portion in the region in which a large tensile vacuum stress is formed in this bulb. In a case where the region in which a large tensile vacuum stress is formed is the inner surface of the body portion, at least a compressive stress layer is formed on the inner surface layer of this region. Accordingly, an allowable stress for designing various portions of the glass bulb can be improved, and particularly, the allowable stress at the body portion at which a large tensile vacuum stress is formed can remarkably be improved, whereby the glass bulb can be made flat, the thickness can be reduced, and consequently, the weight can be reduced. The compressive stress value to be formed on the surface layer of the glass funnel by the chemical strengthening is more preferably at least 130 MPa, most preferably at least 150 MPa. Further, in a case where the above compressive stress layer formed in the region in which a large tension vacuum stress is formed, particularly in the region in which the maximum tensile vacuum stress is formed, of the bulb, is thinner than 60 μm it tends to be difficult to maintain adequate strength when the scratching by #150 emery paper is carried out. Accordingly, the thickness of the compressive stress layer is preferably at least 60 μm, more preferably at least 80 μm.

In this case, although it is possible to chemically strengthen the entire surface of the body portion of the glass funnel, however, the region in which a large tensile vacuum stress is formed, particularly a region in which the maximum tensile vacuum stress is formed on the outer surface of the body portion for example, may partially be chemically strengthened. Namely, with respect to the funnel of the present invention, the chemical strengthening is applied to at least part of the outer surface layer of the body portion in the region in which at least a large tensile vacuum stress is formed. Further, as the chemical strengthening method, a chemical strengthening method of an electric field application type is preferably employed, and particularly when part of the outer surface of the body portion is partially strengthened, the chemical strengthening of an electric field application type by a paste chemical strengthening method is preferred.

Further, in the present invention, the glass at the body portion preferably consists essentially of, as represented by mass percentage of oxides based on the total mass, from 40.0 to 55.0% of $SiO_2$, from 0.5 to 8.0% of $Al_2O_3$, from 4.0 to 10.0% of $Na_2O$, from 5.0 to 10.0% of $K_2O$, from 15.0 to 22.0% of PbO, from 1.0 to 11.0% of SrO, from 0.0 to 6.0% of BaO, from 0.0 to 8.0% of ZnO, from 0.0 to 3.0% of $ZrO_2$, from 0.0 to 2.0% of $Li_2O$, from 0.0 to 5.0% of CaO and from 0.0 to 1.0% of MgO, wherein the total of 1.6 times the above PbO content, the SrO content, the $ZrO_2$ content and 0.5 time the BaO and ZnO contents is at least 37.0%, and the total of the SrO, ZnO and CaO contents is at least 6.0%. Further, the ratio of the $K_2O$ content to the total of the $Na_2O$ content and the $K_2O$ content, $K_2O/(Na_2O+K_2O)$, is preferably from 0.43 to 0.65 as described hereinafter.

The above contents are determined to accomplish improvement of the strength in a shorter period of time by the chemical strengthening method of an electric field application type as compared with a conventional product, while satisfying various characteristics required for a cathode ray tube and to obtain a funnel free from the decrease of the X-ray absorbing ability. Also in the following, "%" represents mass percentage unless otherwise specified.

If the content of $SiO_2$ is less than 40.0%, there will be problem that the chemical durability tends to be poor, and if it exceeds 55.0%, it tends to be difficult to bring the X-ray absorption coefficient to a level of at least 60 $cm^{-1}$, while satisfying various properties required for the funnel. Accordingly, it is preferably from 40.0 to 55.0%. Such a content is more preferably from 45.0 to 51.0%.

If the content of $Al_2O_3$ is less than 0.5%, there will be a problem that the weather resistance tends to be poor, and if it exceeds 8.0%, there will be a problem that the softening point tends to be too high, and the viscosity increase tends to be remarkable as the temperature rises, whereby forming tends to be difficult. Accordingly, it is preferably from 0.5 to 8.0%. Such a content is more preferably from 2.0 to 6.0%.

If the content of $Na_2O$ is less than 4.0%, there will be a problem that the softening point tends to be too high, and the viscosity increase will be remarkable as the temperature rises, whereby forming tends to be difficult, or there will be a problem that it tends to hinder the ion exchange between $Na^+$ ions in the glass and $K^+$ ions in the melt salt containing $KNO_3$ or the molten salt of $KNO_3$, and if it exceeds 10.0%, the electrical resistance tends to decrease. Accordingly, it is preferably from 4.0 to 10.0%. Such a content is more preferably from 6.0 to 9.0%.

$K_2O$ is incorporated in an amount of at least 5.0% for the purpose of controlling the thermal expansion coefficient and an increase of electrical resistance due to a mixed alkali effect with $Na_2O$. However, if it is incorporated beyond 10.0%, there will be a problem that it hinders the exchange between $Na^+$ in the glass composition and $K^+$ in the melt salt containing $KNO_3$ or the molten salt. Accordingly, it is preferably from 5.0 to 10.0%. Such a content is more preferably from 6.0 to 9.0%.

Further, the ratio of the $K_2O$ content to the total of the $Na_2O$ content and the $K_2O$ content, $K_2O/(Na_2O+K_2O)$ is preferably from 0.43 to 0.65 for the purpose of an increase of electrical resistance due to a mixed alkali effect. Out of this range, the conductivity tends to be too high at from room temperature to the operation temperature of the cathode ray tube, and there is a fear of dielectric breakdown.

PbO is a component to improve the X-ray absorbing ability of the funnel. If its content is less than 15.0%, it is difficult to accomplish an X-ray absorption coefficient of at least 60 $cm^{-1}$, and if it exceeds 22.0%, the strain point of the glass is decreased too much, and consequently, the chemical strengthening of an electric field application type cannot be carried out in a short period of time. Accordingly, it is preferably from 15.0 to 22.0%. The content of PbO is more preferably from 17.0 to 21.0%.

SrO is a component capable of improving the X-ray absorbing ability of the funnel, and is a component to increase the conductivity at the strain point by raising the strain point without significantly changing the temperature dependency of the conductivity. If its content is less than 1.0%, it is difficult to accomplish an X-ray absorption coefficient of at least 60 $cm^{-1}$, and if it exceeds 11.0%, there will be a problem that the devitrification temperature tends to be too high, whereby a devitrified substance tends to precipitate and flow into the product. Accordingly, it is preferably from 1.0 to 11.0%. The content of SrO is more preferably from 2.0 to 8.0.

Like SrO, BaO is a component to improve the X-ray absorption coefficient of the funnel, and functions to decrease the devitrification temperature of SrO, and can be added to the glass component. However, if it exceeds 6.0%, there will be a problem that the devitrification temperature tends to be too high, whereby the devitrified substance tends to flow into the product. Accordingly, it is preferably from 0.0 to 6.0%. The content of BaO is more preferably from 0.0 to 4.0.

Like SrO, ZnO is a component to improve the X-ray absorption coefficient of the funnel, and can be added. However, if its content exceeds 8.0%, there will be a problem that the devitrification temperature tends to be too high, whereby a devitrified substance tends to flow into the product. Accordingly, it is preferably from 0.0 to 8.0%. The content of ZnO is more preferably from 0.0 to 6.0.

Like SrO and ZnO, $ZrO_2$ is a component to improve the X-ray absorption coefficient of the funnel, and can be added to the glass component. However, if its content exceeds 3.0%, there will be a problem that the solubility tends to decrease. Accordingly, it is preferably from 0.0 to 3.0%. The content of $ZrO_2$ is more preferably from 0.0 to 2.5.

Further, with respect to PbO, SrO, ZnO, BaO and $ZrO_2$, the total of the contents as represented by mass percentage (1.6 times the content with respect to PbO and 0.5 time the content with respect to ZnO and BaO), i.e. $1.6 \times PbO + SrO + ZrO_2 + 0.5 \times BaO + 0.5 \times ZnO$ is required to be at least 37.0%.

These components have a high mass absorption coefficient, and thus the total is preferably at least 37.0% to secure an X-ray absorption coefficient of at least 60 $cm^{-1}$ at a wavelength of 0.06 nm. Preferably, the total is at most 49%.

Further, as non-essential components, $Li_2O$, CaO, MgO, $Sb_2O_3$ etc. may, for example, be employed.

$Li_2O$ is a component to adjust the viscosity of glass. However, if it exceeds 2.0%, the strain point tends to decrease too much. Accordingly, its content is at most 2.0%, preferably at most 1.0%.

CaO is a component to adjust the viscosity of glass and is a component to raise the strain point without significantly changing the temperature dependency of the conductivity of the glass. However, if it exceeds 5.0%, the softening point tends to be too high, and the viscosity increase tends to be remarkable as the temperature rises, whereby forming tends to be difficult. Accordingly, its content is preferably at most 5.0%.

Like CaO, MgO is a component to adjust the viscosity of glass. However, if it exceeds 1.0%, the softening point tends to be too high, and the viscosity increase tends to be remarkable as the temperature rises, whereby forming tends to be difficult. Accordingly, the content is preferable at most 1.0%.

$Sb_2O_3$ has a refining effect to reduce bubbles in molten glass. However, even if it is used beyond 1.0%, the refining effect is saturated and will not be improved any further. Accordingly, its content is preferably at most 1.0%.

As the refining component, $SO_3$ or $As_2O_3$ may be used other than the above $Sb_2O_3$.

And, in such a case, the total of the contents of SrO, ZnO and CaO is preferably at least 6.0%. These components are components to increase the conductivity at the strain point by raising the strain point without significantly changing the temperature dependency of the conductivity, and the total is preferably at least 6.0%. It is more preferably at most 20.0%.

Further, as the absorption coefficient of X-ray of the glass, the absorption coefficient of X-ray at a wavelength of 0.06 nm is preferably at least 60 $cm^{-1}$. If it is less than 60 $cm^{-1}$, leakage of X-rays radiated from the cathode ray tube cannot adequately be shielded. The absorption coefficient of X-ray is usually represented by $\mu$ ($cm^{-1}$), and is a value calculated by the following mathematical formula (a) wherein a glass composition having a density $\rho$ ($g/cm^3$) is constituted by n types of components, the contents of the above respective components as oxides are represented by $f_{(1)}$ to $f_{(n)}$ (%) respectively, and the mass absorption coefficients of the respective components as oxides at a wavelength of 0.06 nm are represented by $W_{(1)}$ to $W_{(n)}$ ($cm^2/g$), respectively. In the present invention, the X-ray absorption coefficient means the absorption coefficient of X-ray with a wavelength of 0.06 nm, unless otherwise specified.

$$\mu = \rho \sum_{i=1}^{n} \left( \frac{f_{(i)}}{100} \times W_{(i)} \right) \quad (a)$$

And, the cathode ray tube of the present invention employs a funnel which has an absorption coefficient of X-ray of at least 60 $cm^{-1}$ and has a compressive stress of at least 80 MPa imparted so that it has high strength, and accordingly a cathode ray tube which is flat, light in weight and excellent in safety can be provided.

EXAMPLES

Now, the present invention will be described with reference to Examples. Reagent starting materials were mixed to obtain compositions (mass percentage: unit %) of Examples 1 to 6 shown in Table 1, in an amount of 500 g in each Example. Here, Examples 1 and 2 are Working Examples of the present invention, and Examples 3 to 6 are Comparative Examples. Then, the blended starting material were heated and melted at 1500° C. in a platinum crucible and further homogenized by stirring at 1500° C. for 1 hour, followed by refining for 1 hour. After the refining, the molten glass was cast into a plate having a width of 5 cm and a length of 25 cm, followed by annealing. In this manner, fie types of glass plates were obtained. Mass absorption coefficients $\mu_m$ (cm$^2$/g) of the respective components of the glass are shown in Table 2.

TABLE 1

|  | Ex. 1 | Ex. 2 | Ex. 3 | Ex. 4 | Ex. 5 | Ex. 6 |
| --- | --- | --- | --- | --- | --- | --- |
| SiO$_2$ | 49.5 | 50.2 | 52.3 | 52.3 | 53.5 | 51.3 |
| Al$_2$O$_3$ | 4.0 | 4.0 | 3.5 | 3.0 | 3.0 | 5.0 |
| Na$_2$O | 5.8 | 5.8 | 6.5 | 6.0 | 7.3 | 10.3 |
| K$_2$O | 8.0 | 7.8 | 7.6 | 8.5 | 6.5 | 3.5 |
| SrO | 5.0 | 4.0 | 0.5 | 0.0 | 1.0 | 1.0 |
| BaO | 1.0 | 0.5 | 0.5 | 1.0 | 0.0 | 0.5 |
| ZnO | 1.0 | 2.0 | 0.0 | 0.0 | 0.0 | 0.0 |
| CaO | 4.5 | 4.5 | 3.5 | 4.5 | 3.0 | 4.0 |
| ZrO$_2$ | 1.0 | 0.5 | 0.2 | 1.0 | 0.0 | 1.0 |
| MgO | 1.0 | 0.5 | 2.0 | 1.5 | 2.0 | 1.5 |
| Sb$_2$O$_3$ | 0.2 | 0.2 | 0.2 | 0.2 | 0.2 | 0.4 |
| PbO | 19.0 | 20.0 | 23.2 | 22.0 | 23.5 | 21.5 |

TABLE 2

| Component | $\mu_m$ (cm$^2$/g) |
| --- | --- |
| SiO$_2$ | 2.34 |
| Al$_2$O$_3$ | 2.11 |
| Na$_2$O | 1.69 |
| K$_2$O | 8.45 |
| SrO | 53.4 |
| BaO | 25.1 |
| ZnO | 28.5 |
| CaO | 8.81 |
| ZrO$_2$ | 53.5 |
| MgO | 1.92 |
| Sb$_2$O$_3$ | 18.2 |
| PbO | 82.9 |

Further, the following values calculated with respect to each Example based on the contents in Table 1, are shown in Table 3.

TABLE 3

|  | Ex. 1 | Ex. 2 | Ex. 3 | Ex. 4 | Ex. 5 | Ex. 6 |
| --- | --- | --- | --- | --- | --- | --- |
| *1 | 37.4 | 37.8 | 38.1 | 36.7 | 38.6 | 35.7 |
| *2 | 11.5 | 11.0 | 4.2 | 5.5 | 4.0 | 5.0 |
| *3 | 0.58 | 0.57 | 0.54 | 0.59 | 0.47 | 0.25 |

(*1): Total of contents of PbO, SrO, BaO, ZnO and ZrO$_2$ (%) = 1.6 × PbO content (%) + SrO content (%) + ZrO$_2$ content (%) + 0.5 × BaO content (%) + 0.5 × ZnO content (%)
(*2): Total of contents of SrO, ZnO and CaO (%) = SrO content (%) + ZnO content (%) + CaO content (%)
(*3): Ratio of K$_2$O content to the total of Na$_2$O content and K$_2$O content = K$_2$O content (%)/(Na$_2$O content (%) + K$_2$O content (%))

Then, with respect to each glass plate after annealing, the density was measured by an Archimedes method, and the X-ray absorption coefficient at a wavelength of 0.06 nm was calculated by the formula (a).

Further, from each glass plate, a first sample piece having a width of 2 cm, a length of 5 cm and a thickness of 1 cm was cut out. With respect to only five samples of Examples 1, 2, 4, 5 and 6, chemical strengthening of an electric field application type was carried out. Specifically, a paste containing KNO$_3$ was coated on the two sides of the glass, followed by drying, an anode was disposed on one coated surface in contact with each other, and a cathode was disposed on the opposite coated surface in contact with each other. The assembly was heated in an electric furnace, and a voltage of 250 V was applied while maintaining the assembly at a predetermined retention temperature to carry out a chemical strengthening treatment of an electric field application type for a predetermined retention time, whereby a compressive stress layer was formed on the surface of one side of each first sample piece. The treatment conditions of the chemical strengthening, i.e. the retention temperature (° C.) and the retention time (hour) in the electric furnace when the treatment was carried out by the chemical strengthening method in the electric furnace are shown in Table 4.

Then, with respect to the first sample piece of each Example subjected to the chemical strengthening treatment, the sample piece was gradually cooled, then washed and dried. Each of such five first sample pieces thus obtained, was sliced, and the thickness (μm) of the compressive stress layer in the thickness direction of glass and the compressive stress value (MPa) were measured by means of a polarizing microscope equipped with a Berek compensator, from the cross-sectional direction, by a Berek method.

Further, from each of glass plates having the same compositions as the first sample pieces of Examples 1 to 6, a second sample piece having a width of 1.5 cm, a thickness of 0.5 cm and a length of 6 cm was cut out, and with respect to only the second sample pieces of Examples 1, 2, 4, 5 and 6, a chemical strengthening treatment was applied to the surface of one side in the same method as in the case of the first sample pieces, and the bending strength (MPa) of each of the second sample pieces of Examples 1 to 6 was measured by a four point bending strength test. The four point bending strength test is a method wherein a load is exerted to a sample, and the strength is calculated from the load at break. Specifically, it is a method wherein the above second is sample piece is scratched by a polishing paper of a grain size #150 with a force of about 0.1 MPa, and then it is set by a jig having a lower span of 55 mm and an upper span of 10 mm, and the four point bending strength measurement is carried out. For this bending strength measurement, the compressive stress layer formed by the chemical strengthening treatment faced downward.

The values of the measurement results of the glass density (g/cm$^3$), the X-ray absorption coefficient (cm$^{-1}$), the strain point (° C.), the average thermal expansion coefficient of from 0° C. to 300° C. (×10$^{-7}$/° C.), the conductivities (S/cm) at the strain point and at 150° C., the compressive stress value (MPa) of the glass surface layer and the thickness (μm) of the compressive stress layer with respect to the first sample piece, and the bonding strength (MPa) after scratching with respect to the second sample piece are shown in Table 4. Here, the above conductivity was measured by an alternating current two-terminal method, and an extrapolation value to the zero frequency was obtained in the Cole-Cole plot and is taken as the DC conductivity.

TABLE 4

| | Ex. 1 | Ex. 2 | Ex. 3 | Ex. 4 | Ex. 5 | Ex. 6 |
|---|---|---|---|---|---|---|
| Glass density (g/cm$^3$) | 3.09 | 3.08 | 3.01 | 3.01 | 3.01 | 3.03 |
| X-ray absorption coefficient (cm$^{-1}$) | 67 | 67 | 67 | 65 | 68 | 64 |
| Strain point (° C.) | 466 | 455 | 441 | 454 | 430 | 430 |
| Thermal expansion coefficient ($\times 10^{-7}$/° C.) | 97.1 | 97.0 | 96.9 | 96.8 | 97.1 | 97.3 |
| Conductivity (S/cm) (strain point) | $5 \times 10^{-6}$ | $7 \times 10^{-6}$ | $1.5 \times 10^{-6}$ | $1 \times 10^{-6}$ | $1 \times 10^{-6}$ | $8 \times 10^{-6}$ |
| Conductivity (S/cm) (150° C.) | $3 \times 10^{-13}$ | $2 \times 10^{-13}$ | $1 \times 10^{-12}$ | $2 \times 10^{-12}$ | $9 \times 10^{-13}$ | $5 \times 10^{-11}$ |
| Retention temperature (° C.) | 460 | 450 | — | 440 | 450 | 430 |
| Retention time (hr) | 2 | 3 | — | 2 | 3 | 3 |
| Compressive stress value (MPa) | 200 | 220 | — | 190 | 50 | 170 |
| Thickness of compressive stress layer (μm) | 90 | 80 | — | 20 | 30 | 80 |
| Bending strength after scratching (MPa) | 230 | 250 | 26 | 70 | 60 | 200 |
| Funnel mass (kg) | 13 | 13 | 22 | 13 | 13 | 13 |
| Hydraulic pressure resistance strength (MPa) | 3.1 | 3.0 | 3.5 | 2.1 | 1.9 | 2.9 |
| CRT operation condition | Normal | Normal | Normal | Normal | Normal | Dielectric breakdown occur |

Further, by using each of the glasses of the compositions of Examples 1 to 6, a 36 inch funnel having an angle of deflection of 125° is produced. With respect to the funnels of Examples 1-F, 2-F, 4-F, 5-F and 6-F, the tensile vacuum stress to be formed on the funnel after evacuation is calculated by numerical simulation, and to the region in which the vacuum stress is at least about 10 MPa, a chemical strengthening treatment of an electric field application type is applied under the same conditions as in the case of the above sample piece. The funnel of Example 3-F is non-strengthened. The body portion of each funnel has the least thickness allowable when the vacuum stress is loaded.

Then, a neck is welded on the body portion of each funnel, and the funnel and a panel having a known composition (aspect ratio=16:9) are sealingly bonded to produce glass bulbs of Examples 1-F to 6-F. Then, of each of these glass bulbs, the hydraulic pressure resistance strength (MPa) is measured. The method to measure the hydraulic pressure resistance strength is a test method wherein each glass bulb is put in a huge hydraulic pressure resistance tank and the glass bulb is pressurized from the outside while maintaining the interior of the glass bulb to be under atmospheric pressure, and the pressure when the bulb is broken is taken as the hydraulic pressure resistance strength. Further, a cathode ray tube (CRT) is reproduced from each glass bulb, and an operation voltage is applied to evaluate the operation condition of each cathode ray tube.

In the following Table 5, the funnel mass (kg), the value of the hydraulic pressure resistance strength (MPa) of the glass bulb (funnel) and the operation condition of CRT of Examples 1-F to 6-F are shown.

TABLE 5

| | Ex. 1-F | Ex. 2-F | Ex. 3-F | Ex. 4-F | Ex. 5-F | Ex. 6-F |
|---|---|---|---|---|---|---|
| Funnel mass (kg) | 13 | 13 | 22 | 13 | 13 | 13 |
| Hydraulic pressure resistance strength (MPa) | 3.1 | 3.0 | 3.5 | 2.1 | 1.9 | 2.9 |

TABLE 5-continued

|  | Ex. 1-F | Ex. 2-F | Ex. 3-F | Ex. 4-F | Ex. 5-F | Ex. 6-F |
|---|---|---|---|---|---|---|
| CRT operation condition | Normal | Normal | Normal | Normal | Normal | Dielectric breakdown occur |

As a result, in Example 4, the conductivity at the strain point is low since the content of SrO is lower than that of the present invention, and no adequate strengthening can be achieved by the chemical strengthening method of an electric field application type. As a result, even though the chemical strengthening treatment is carried out at the same retention temperature for the same retention time as in Example 1, the thickness of the compressive stress layer is only 20 μm and a compressive stress layer of at least 60 μm cannot be imparted. Accordingly, the bending strength after scratching is small, and no desired hydraulic pressure resistance strength can be obtained. In Example 1, the compressive stress value is 200 MPa and a compressive stress layer with a thickness of 90 μm can be formed, and the hydraulic pressure resistance strength is satisfactory also.

Further, in Example 5, PbO is contained in a larger amount than the content of the present invention and as a result, SrO+ZnO+CaO<6.0%, and the conductivity at the strain point is small. Thus, no adequate strengthening can be achieved by the chemical strengthening method of an electronic field application type. As a result, even though the chemical strengthening treatment is carried out at the same retention temperature for the same retention time as in Example 2, no compressive stress layer with a thickness of at least 60 μm nor compressive stress of at least 80 MPa can be obtained. Accordingly, the bending strength after scratching is small, and only an extremely small hydraulic pressure resistance strength can be obtained. On the other hand, in Example 2, a compressive stress layer with a thickness of 80 μm, having a compressive stress value of 220 MPa, can be formed under the same strengthening conditions, and an adequately high hydraulic pressure resistance strength can be obtained.

Further, the funnel of Example 6 is chemically strengthened substantially similarly to Examples 1 and 2 of the present invention, and the hydraulic pressure resistance strength is satisfactory. However, since the conductivity at 150° C. is high, dielectric breakdown may occur if a cathode ray tube is reproduced and an operation voltage is applied. Each of the funnels of Examples 1 to 5 does not undergo dielectric breakdown even if an operation voltage is applied and is normal.

Further, with respect to the funnel of Example 3 having no chemical strengthening treatment applied, the hydraulic pressure resistance strength is satisfactory since the body portion is thick in order to be durable against vacuum stress, however, it becomes very heavy and it is difficult to reduce the weight. As compared with such Example 3, with other funnels having chemical strengthening applied, it is possible to reduce the weight by about 40%.

INDUSTRIAL APPLICABILITY

As described above, the funnel of the present invention is suitable for chemical strengthening of an electric field application type since the strain point of glass is high and the conductivity at the strain point is good as compared with a conventional one, and a compressive stress layer having a desired thickness can be formed in a relatively short period of time. Further, by decreasing the conductivity of the glass in the temperature region in the vicinity of the operation temperature of the cathode ray tube, occurrence of dielectric breakdown can be reduced even if the funnel is made thin. Accordingly, the funnel can be made flat and thin without impairing the safety, and consequently, its weight can be reduced. Further, by using such a funnel, it is possible to obtain a cathode ray tube which is excellent in safety, which is flat and which is light in weight.

The entire disclosure of Japanese Patent Application No. 2002-058740 filed on Mar. 5, 2002 including specification, claims, drawings and summary is incorporated herein by reference in its entirety.

What is claimed is:

1. A glass funnel for a cathode ray tube, characterized in that
    glass at a body portion contains at least $Na_2O$, $K_2O$ and 15.0 to 22.0 mass % PbO,
    the conductivity of said glass at the strain point is at least $4 \times 10^{-6}$ S/cm,
    the conductivity at 150° C. is at most $5 \times 10^{-12}$ S/cm, and
    a compressive stress layer is formed by a chemical strengthening method on at least part of an outer surface of the body portion.

2. A glass funnel for a cathode ray tube, characterized in that
    glass at the body portion contains at least $Na_2O$, $K_2O$ and 15.0 to 22.0 mass % PbO,
    the conductivity of said glass at the strain point is at least $4 \times 10^{-6}$ S/cm, the conductivity at 150° C. is at most $5 \times 10^{-12}$ S/cm, and
    wherein the glass funnel is formed into a glass bulb and, a compressive stress layer is formed by a chemical strengthening method on at least an outer surface of the body portion of the glass funnel in a region in which a large tensile vacuum stress is formed in this bulb.

3. The glass funnel for a cathode ray tube according to claim 1, wherein when the glass funnel is formed into a glass bulb, a compressive stress layer is formed by a chemical strengthening method on at least the outer surface of the body portion of the glass funnel in the region in which the maximum tensile vacuum stress is formed in this bulb.

4. The glass funnel for a cathode ray tube according to claim 1, wherein the strain point is at least 455° C.

5. The glass funnel for a cathode ray tube according to claim 1, wherein the thickness of at least part of the compressive stress layer is at least 60 μm.

6. The glass funnel for a cathode ray tube according to claim 1, wherein the stress value of at least part of the compressive stress layer is at least 80 MPa.

7. The glass funnel for a cathode ray tube according to claim 1, wherein
    the glass at the body portion consists essentially of, as represented by mass percentage of the oxides based on the total mass,

| | |
|---|---|
| $SiO_2$ | 40.0 to 55.0%, |
| $Al_2O_3$ | 0.5 to 8.0%, |
| $Na_2O$ | 4.0 to 10.0%, |
| $K_2O$ | 5.0 to 10.0%, |
| PbO | 15.0 to 22.0%, |
| SrO | 1.0 to 11.0%, |
| BaO | 0.0 to 6.0%, |
| ZnO | 0.0 to 8.0%, |
| $ZrO_2$ | 0.0 to 3.0%, |

-continued

| | |
|---|---|
| Li$_2$O | 0.0 to 2.0%, |
| CaO | 0.0 to 5.0%, and |
| MgO | 0.0 to 1.0%; |

1.6×PbO+SrO+ZrO$_2$+0.5×BaO+0.5×ZnO≧37.0%; and SrO+ZnO+CaO≧6.0%.

8. The glass funnel for a cathode ray tube according to claim 1, wherein the mass content ratio of Na$_2$O and K$_2$O in the glass at the body portion, K$_2$O/(Na$_2$O+K$_2$O), is from 0.43 to 0.65.

9. The glass funnel for a cathode ray tube according to claim 1, wherein the X-ray absorption coefficient is at least 60 cm$^{-1}$ at a wavelength of 0.06 nm.

10. A cathode ray tube employing the glass funnel for a cathode ray tube as defined in claim 1.

11. A method of making a glass funnel, the method comprising
  forming a compressive stress layer by a chemical strengthening method on at least part of an outer surface of a body portion of a glass funnel for a cathode ray tube; and
producing the glass funnel of claim 1.

* * * * *